March 26, 1968 R. E. FISHER ET AL 3,374,607
APPARATUS FOR AND METHOD OF COLLECTING
GAS CHROMATOGRAPHIC FRACTIONS
Filed April 4, 1966
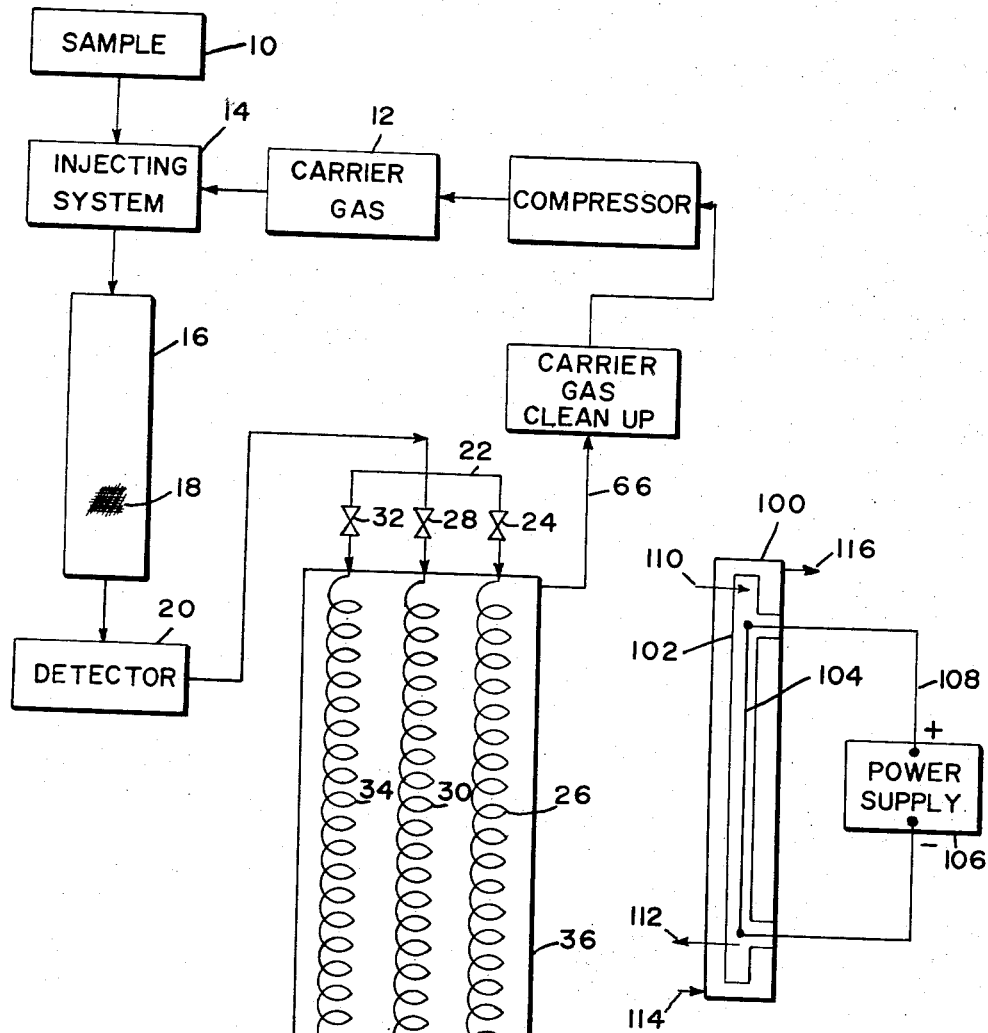
FIG. 2
FIG. 1
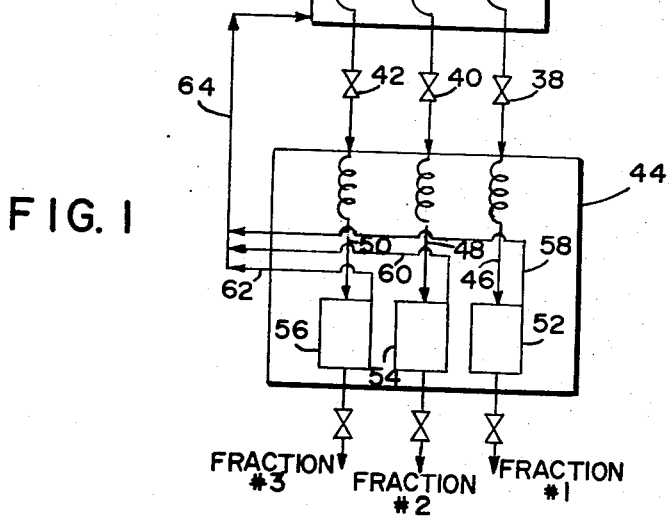
INVENTOR
ROBERT E. FISHER
MICHAEL MODELL
JAMES M. RYAN
ATTORNEY

United States Patent Office 3,374,607
Patented Mar. 26, 1968

3,374,607
APPARATUS FOR AND METHOD OF COLLECTING GAS CHROMATOGRAPHIC FRACTIONS
Robert E. Fisher, Allentown, Pa., and James M. Ryan, Weston, and Michael Modell, Brighton, Mass., assignors, by mesne assignments, to Abcor, Inc., Cambridge, Mass., a corporation of Massachusetts
Filed Apr. 4, 1966, Ser. No. 540,079
21 Claims. (Cl. 55—67)

ABSTRACT OF THE DISCLOSURE

A gas chromatographic apparatus and process which includes gradually cooling and condensing a gas effluent stream by the use of a cool fluid stream in a counter-current flow direction and heat exchange relationship by the use of a single or plural zones. A gas effluent stream containing a carrier gas and a gas fraction to be recovered is withdrawn from a chromatographic column and passed to plural and separate heat exchanger and recovery zones. Carrier gas cooled in the recovery zone is recycled in a counter-current direction to the gas effluent stream in the heat exchange zone. The temperature gradient provided in the heat exchange zone by the recycled carrier gas prevents aerosol formation of the gas fraction and efficiently employs the cool carrier gas to condense the gas fraction in the heat exchange zone.

---

Our invention concerns gas chromatography fraction collection systems. In particular our discovery relates to methods of and means for the efficient collection of gas effluent fractions from one or more gas chromatographic systems.

Gas chromatography involves the chromatographic separation of various compounds, sample materials, mixtures and the like as gas chromatographic fractions from a gas sample stream. Preparative or production scale gas chromatography includes the recovery of one or more of these fractions from the gas effluent stream withdrawn from a chromatographic column. The gas effluent stream comprises the carrier gas and the fraction in the gas phase to be recovered or removed.

The usual techniques of fraction collecting involve direct refrigeration or cooling of the fraction-containing gas effluent stream to condense the fraction to the liquid or solid state. The fraction condensed is then recovered from the cooled surfaces of the condensing vessel. These means are usually quite direct and simple. However, the efficiency of collection, i.e., the percent of the gas fraction recovered, is often quite low, and where difficultiy separated, expensive or exotic fractions are to be collected or removed, these direct means may be economically unattractive and/or inadequate. Collection efficiencies of 90% or higher are often desirable or required for the economic use of preparative or production scale gas chromatography systems. The preparative systems employ chromatographic columns having a diameter of 1 to about 6 inches, while production scale systems refer to larger diameter columns such as 1 to 4 feet or greater. In preparative and production scale chromatographic systems, the fixed capital and operating costs of a high efficiency fraction collection scheme employing a refrigeration system alone is often a considerable part of the total fixed and operating cost of the total chromatographic system. It is, therefore, most desirable to provide fraction collecting systems of reduced cost and high efficiency.

The fraction collecting of the gas effluent from a gas chromatographic system presents several unique difficulties. Usually, the effluent gas stream withdrawn from the outlet of a gas chromatographic column has a very low concentration of the gas fraction to be recovered. If the fraction to be recovered exceeds 50% or more in the gas effluent stream, direct cooling may be the preferred method of collection, while lesser amounts such as less than 25% may require special techniques for collection efficiencies of 90% or more. For example, the effluent gas stream may typically contain only 0.1 to 10.0 mol percent of the desired gas fraction in the inert carrier gas stream. Where very expensive sample materials such as steroids, essential oils, flavors, special research mixtures, and the like are processed, the amount of the sample fraction in the effluent gas stream may be even lower, such as from 0.001 to about 0.1 mol percent. The dilution of the sample vapor with the inert carrier gas, therefore, presents problems in fraction collecting. Rapid and direct cooling of the effluent stream to condense the desired fraction provides condensation, but quite often in the form of a fog or aerosol of the fraction in the carrier stream which makes the subsequent recovery of the fraction increasingly more difficult and expensive.

One of the most common methods of recovering the gas fraction from a gas effluent stream is to withdraw the gas effluent stream from the chromatographic column and introduce the stream into a cold trap to induce condensation of the gas fraction. This collection technique often provides poor efficiency of collection, particularly where the gas fraction to be recovered is less than 5 percent of the gas effluent stream. Rapid or shock cooling of the gas effluent stream causes formation of aerosol or fog of minute condensed droplets of the gas fraction in the gas effluent stream. Such aerosol or fog droplets are particularly difficult to coalesce, and flow out of the collection system with the carrier gas when the droplets are of the order of 1 to 10 microns or less. There have been several previous proposals to improve the collection efficiency such as by super-heating the gas effluent stream and then cooling the stream step-wise to the condensation temperature of the gas fraction. Another proposal has been to employ a gas carrier stream that condenses at the cooling or condensation temperatures employed for the gas fraction. Conventional cold trap systems have been modified by inserting in the system a "hot finger" to reduce the formation of the aerosol particles. A stream of hot water is passed through the hot finger, while the external walls of the surrounding cold trap are maintained at the condensation temperature. However, none of these prior proposals or schemes have been entirely satisfactory in increasing the efficiency of the collecting systems and in effecting a significant reduction in aerosol particle formation.

It is, therefore, one object of our invention to provide a system for the efficient collection of gas fractions from a gas effluent chromatographic stream.

It is another object of our invention to provide means for and a method of inhibiting the formation of aerosol particles during the cooling of a gas effluent stream.

A further object of our discovery is to provide a means of fraction collecting by providing a temperature gradient along the gas effluent stream flow path in a condensation system which method promotes the efficient condensation and collection of the gas fraction at a reduced cost while avoiding the shock cooling of the gas effluent stream.

Other objects and advantages of our invention will be apparent to those persons skilled in the art from the following more detailed description of the invention taken together with the accompanying drawing wherein:

FIG. 1 is a schematic illustration of a chromatographic system including our gas fraction collecting apparatus; and FIG. 2 is a schematic diagram of another embodiment of a fraction collecting system of our invention.

Briefly, our invention comprises cooling a gas effluent stream from a chromatographic system along the gas flow path in a cooling and condensing zone. The cooled condensed gas effluent stream comprising a carrier gas and a gas fraction to be recovered is withdrawn from the first zone, and introduced into a second zone. A means is then provided that separates the condensed liquid or solid from the carrier stream.

In our invention the gas fraction and carrier gas may be condensed in whole or part in the cooling zone. Where a relatively difficult to condense or non-condensable carrier gas is employed like helium or nitrogen, only the gas fraction or a part thereof is condensed in the cooling zone. The condensation of the remaining gas fraction may take place in a separate zone, and the cooled carrier gas separated from the condensed fractions and employed in lowering the temperature of the cooling zone prior to recovery or recycle in this or another system. In some operations all or part of the carrier gas may be condensed with the gas fraction, and the carrier gas and gas fraction then separated. Where a shell or tube or other heat exchanger is employed, the cooling zone may be the tube or shell side, while the cooled carrier gas or other differential temperature device is employed in the other preferably surrounding zone. In one practical embodiment a single or multi-pass shell and tube heat exchanger may be employed with the cooled carrier gas passed from one to the other end through this exchanger in one zone, and with the gas effluent stream from the column passed from the other to one end of a separate zone in a heat exchanger relationship with the one zone. Such an arrangement inhibits the formation of aerosol particles, avoids shock cooling of the gas effluent stream, and promotes efficient use of the cooled carrier gas.

In one embodiment the gas effluent stream from the separating means comprising primarily carrier gas, with perhaps minor amounts or traces of the gas fraction, is then recycled and passed in a substantially counter-current or cross-current flow direction through the first zone chamber to create a temperature gradient. Additional cooling or refrigeration of the cooling zone may be accomplished in conjunction with the recycle of the cooled carrier gas if desired. In this manner a temperature gradient is created along the gas flow path of the gas effluent stream in the first cooling and condensing zone. This temperature may range at the one end of the cooling zone from the temperature at which the gas effluent stream is introduced into the zone, i.e., a temperature of from 0 to 300°, for example, 50 to 250° C. at the other end of the zone to a temperature of minus 50 to plus 150° C. A typical temperature gradient along the gas flow path of the zone may range from 200 to 50° C. depending upon the gas fraction to be recovered, the flow rate and temperature of the gas effluent stream, and other factors.

In practice one, two, three or more zones may be located within a common cooling or recycle chamber depending upon the number of fractions to be recovered or separated. Such an arrangement is desirable in that the cooled gas effluent stream recycled from the separator will then maintain the proper temperature equilibrium in the chamber. It is also, of course, contemplated that the gas effluent streams from one or more chromatographic gas systems or columns may be introduced into our fraction collection systems. Although one practical and economical embodiment comprises the use of the recycled, cooled carrier gas which permits effective and economic use of the cooled gas effluent stream, any cooled liquid or gas streams from any source may be employed.

In another embodiment of our invention our fraction collecting system may include as a component part thereof an elongated tube through which the gas effluent stream is passed, which tube is characterized by interior heated element such as a tube or wire, while the exterior of the tube is maintained at a lower temperature. For example, we have found that an elongated tube containing an electrically heated wire centrally positioned therein may be advantageously employed as a cooling or condensing zone, or in combination with the cooling chamber. The use of such heated wire structures is especially desirable in those cases where aerosol particles are most likely to form. Although the heated wire structure may be used prior to or after the gas effluent stream enters the cooling zone, its preferred embodiment is its use in gas flow communication or in line with and after the cooling zone and prior to the condensing zone. The elongated tube of the heated wire structure may be cooled by conventional cooling or refrigeration means or by the recycle of the gas effluent stream from the condensing means in a similar manner as in the cooling chamber. Thus, the heated wire structure may employ a common temperature along the entire exterior of the elongated tube, or may use recycled gas effluent stream from the condensation zone to create a temperature gradient throughout the length of the tube. This latter arrangement provides the advantages of the present invention, while permitting additional flexibility and control of the temperature of the gas effluent stream through the use of the heated wire.

Our discovery which includes a controlled cooling rate for the gas effluent stream in an economical and practical manner avoids many of the difficulties associated with prior practices. Our system enhances the efficiency and ease of fraction collecting, while inhibiting the formation of aerosol particles in the gas effluent stream during condensation. Our apparatus and method is applicable to the collection, recovery, or removal of any gas fractions from any gas effluent stream of chromatographic systems, which fractions are capable of being condensed to liquid or solid form.

For the purposes of illustration only our process and system will be described in connection with the recovery of cis-pentene-2 fractions from an isomeric hydrocarbon mixture containing cis-pentene-2, trans-pentene-2, and at least one other fraction. As will be apparent our system may be operated as a continuous or batch process. Normally, the gas effluent stream withdrawn from a chromatographic column comprises a repeating series of relatively pure gas fractions, which fractions discharge or are withdrawn from the column over a predetermined period of time such as from 10 seconds to 5 minutes or more. In the recovery of these fractions if a completely separate fraction collection system is designed for collecting specifically each of these fractions, it may be difficult to achieve equilibrium conditions within the first chamber in a sufficiently short time to obtain satisfactory collection efficiency for each fraction. However, in our system when the cooled gas effluent stream is recycled from all separators and from all gas fractions into a common first chamber, an equilibrium condition in the cooling chamber is maintained in a short period of time after operation.

A predetermined volume of hydrocarbon mixture containing cis- and trans-pentene-2 is introduced from a sample source 10 into an injection system 14. For example 15 milliliters comprising about 49 percent each of cis-pentene and trans-pentene is injected into the upstream of a relatively large diameter, for example a 4 inch chromatographic column 16 containing a packed bed of separatory material 18. In our example the carrier gas is helium with the temperature of the column maintained at approximately 30° C. with the separatory material being diatomaceous earth, Johns-Manville Chromosorb P coated with a liquid phase of about 30 percent based on the dry weight of the 60/80 mesh packing, with a solution of triethylene glycol saturated with silver nitrate. The pentene mixture is injected into the column over a 15 second period, the pentene mixture being present in an amount of about 25 mol percent based on the mols of helium carrier gas employed.

On passage through the column 16 the pentene mixture is separated into three prime gas chromatographic fractions. This sample mixture is driven to the downstream end of the column 16 in a generally axially direction by the use of an inert carrier gas such as helium introduced into the upstream end of the column 16 and from a source 12. The carrier gas may be introduced either into the injection system as shown or directly into the top of the column, either mixed with the gas sample or injected between sample volume injections. Typical carrier gases which may be employed in chromatographic systems include such inert carrier gases as nitrogen, argon, air, steam, hydrogen, methane and the like and mixtures thereof. The separatory material 18 is selected based on the differential rate of adsorption or absorption required to separate the sample mixture into its various chromatographic fractions. The separatory material may comprise a gel or polymeric-like material having open passages therein, solid particulate material, or, as in the present case, solid particulate material coated with a thin liquid phase. A gas effluent stream containing each gas fraction as separated by the column is conducted from the exit end of the chromatographic column 16 to and through a detector 20 and hence into a manifold conduit 22. The detector employed may be a pair of thermal-conductivity cells which balance the heat conduction of the gas effluent stream from the exit end of the chromatographic column 16 against the pure carrier gas used in order to detect a particular gas fraction being withdrawn from the column. Depending upon the system employed other detectors such as flame ionization detectors, electron capture detectors, argon ionization detectors, cross-section detectors, electron mobility detectors, ultrasonic detectors, radio frequency detectors, gas density balances, mass spectrometers, and other fraction identifying or detecting means may be employed. In large diameter columns or systems the detecting means may be omitted and the operation of the system programmed from data obtained on analytical or pilot systems. The gas effluent stream from the chromatographic column 16 is switched to each or a particular collection system only when the particular gas fraction to be condensed is emerging from the column. In our illustrated example three possible collection chambers are positioned as shown.

The trans-pentene-2 gas fraction moves through the chromatographic column 16 faster than the cis-pentene-2 and is detected first by detector 20, passed into the branch manifold 22 and introduced through open valve 24 into a hollow tube or coil 26. The coil as shown is an elongated copper tubing; however, spiral or other forms may be employed. Similarly for each fraction there is a valve 28 and 32 with cooling coils 30 and 34. Valves 28 and 32 are maintained closed until that particular gas fraction is emerging from the column at which time valve 24 would be closed and the next valve opened in sequence. These and other valves described in connection with our fraction collecting system may, of course, be operated by hand or be responsive to the detector output. In preparative or production scale gas chromatographic systems or where a plurality of gas effluent streams and gas chromatographic columns are being employed, it would be preferable that the valves be solenoid valves in electrical communication with the detector to provide for the automatic and sequential opening and closing of the valves.

The cooling coils are located within an insulated cooling chamber 36 preferably an elongated tube. The tube length is selected to provide the proper temperature gradient and cooling to the gas effluent stream. Valves 38, 40 and 42 permit the respective gas effluent streams containing each particular fraction to be withdrawn from the coils and introduced into a recovery zone 44, and through conduits 46, 48 and 50 introduced into collection vessels 52, 54 and 56. Conduits 58, 60 and 62 permit withdrawal of a gas effluent stream from the each respective vessels back to recycle conduit 64. Conduit 66 permits recycling of the gas effluent stream from the cooling chamber 36 to a carrier gas clean-up zone and hence to a compressor wherein the carrier gas in reintroduced into its source 12 for reuse in column 16. In the carrier gas clean-up zone moisture or impurities are removed from the carrier gas. The means 44 may comprise any means to cool and further condense the gas effluent stream, such as refrigerating coils or a liquid bath of acetone with Dry Ice therein. For the purposes of illustration only the fraction collecting vessels are shown located within the second zone; however, insulated separator vessels located outside of the zone may be employed to recover each particular gas fraction condensed.

In operation the gas effluent fraction containing the trans-pentene-2 fraction is introduced into coil 26 through open valve 38 and conduit 46 through the second zone and the trans-pentene-2 is collected in collection vessel 52. The condenser is maintained at a temperature of minus 80 to minus 90° C. The non-condensed helium carrier gas is recycled from the storage vessel 52 through conduit 58 into recycle conduit 64 and hence into the one end of cooling chamber 36. In a similar manner, as each gas fraction is processed through its respective coil conduits and separator, the cooled non-condensed helium carrier gas of the gas effluent stream is introduced into recycle conduit 64 for introduction into the one end of the cooling chamber. As the cooled helium gas flows through the cooling chamber 36 through a temperature gradient of from about minus 80° C. to minus 50° C. at the inlet end of the chamber to minus 20° C. to plus 20° C. at the other or outlet end of the chamber, the helium is withdrawn through recycle conduit 66. Since as each fraction is being recovered a continual flow of cooled non-condensable helium gas is introduced through the cooling chamber 36 equilibrium cooling conditions can be easily maintained. The gas effluent stream containing the cis-pentene-2 fraction is withdrawn from the column after about 6 minutes and valve 32 opened to permit the flow into coil 34 of this fraction. When no recoverable gas fraction is emerging in the gas effluent stream withdrawn from the column the gas effluent stream may be passed through open valve 28 and coil 30 in order to maintain equilibrium cooling conditions in the cooling chamber. In this manner any condensable matter present in the gas effluent stream between the two emerging pentene fractions may be condensed and removed by passage through valve 28, coil 30, valve 40 and conduit 48 and the impurities or condensables segregated in vessel 54. Where required make-up refrigeration or cooling may be employed to maintain the temperature of the second zone or of the recycled helium gas as desired.

In the system described the efficiency of collection was approximately 95 percent or above for the collection of the trans-pentene-2 fraction and 95 percent or above for the cis-pentene-2 fraction. Significantly, poorer results were obtained when conventional cooling and collection techniques were employed. For example, when cooling coils and respective recovery vessels were put in series with each other and each cooled by refrigerant, only about 51 percent of the trans-pentene-2 fraction was collected, the rest of the fraction forming or escaping in aerosol particle form. Where a single cooling coil and recovery vessel was used only 35 percent of the trans-pentene-2 fraction was successfully collected. Correspondingly, poorer collection results for the cis-pentene-2 fractions were obtained by these other procedures. It is, therefore, apparent that our system avoids the shock cooling problems, and the resultant formation of aerosols present in conventional collection techniques, while exhibiting good collection efficiency.

Our system provides a means whereby the rate of temperature cooling of the gas effluent stream is slower than direct cooling or shock cooling of the gas effluent stream. Though not wished to be bound by any particular theory or mode of operation it is believed that the formation of aerosol particles by prior techniques has been the result of a rapid temperature drop to about or below the dew point temperature of the gas fraction to be recovered. Our system provides a practical and economical means of controlling the rate of approach of the gas fraction to saturation or incipient condensation conditions so that aerosol formation is prevented or minimized. Rapid movement from the vapor phase to the liquid phase or super-saturated vapor-liquid phase, e.g. below the dew point line in a typical vapor pressure versus temperature graph induces massive or gross liquid condensate or aerosol formation or both. While gross condensate is desirable, aerosol formation is not and, therefore, our controlled rate of approach to and through the dew point conditions permits condensation with minimum aerosol formation. Our system and process is also believed to inhibit the degree of penetration into the super-saturated zone and to provide the early development of condensed gas fraction to serve as a nucleating agent for the formation of more massive condensate. Although our example has been described by the introduction of the gas effluent stream into our fraction collecting system employing with the stream at the temperature as withdrawn from the column it may be desirable in some cases to heat the withdrawn gas effluent stream to a higher temperature, e.g. 5 to 150° C. higher than the temperatures as withdrawn, in order to permit a better approach rate or approach slope to the dew point line. It is also desirable in the operation of our fraction collecting system to obtain condensation of the gas fraction, but to avoid subjecting the bulk of the carrier gas from which the gas fraction is dispersed to condensation conditions.

FIG. 2 illustrates another embodiment of our invention wherein an outer cylindrical cooling chamber 100 surrounds an inner cylindrical elongated cooling zone 102, which zone has centrally positioned therein a resistance wire 104 connected through leads 108 to a power source 106. The inner cooling cylinder 102 is provided with a conduit 110 at the one end to introduce a gas effluent stream and a conduit 112 at the other end to withdraw a gas effluent stream from the cooling zone. The outer cooling chamber 100 contains a conduit 114 to introduce a cooled recycled carrier stream and a conduit 116 to withdraw this stream from the other end of the cooling chamber. The cooling chamber 100 may be maintained at a predetermined temperature by any suitable cooling means or in its preferred embodiment may utilize a temperature gradient through the use of recycled cold carrier gas as illustrated in the FIG. 1 embodiment. The electrical heating element or resistance wire 104 is illustrated in straight line form; however, where additional heat input is desired spiral, coil or other forms may be employed. The heating wire should be selected so as to be non-reactive with the gas effluent stream. Typical resistance material may include nickel and copper alloys and the like such as Nichrome wire.

In operation the apparatus of FIG. 2 provides an additional and flexible means for controlling the rate of cooling of a gas effluent stream from a chromatographic column. A gas effluent stream withdrawn from a chromatographic column or from a cooling zone from the cooling chamber of an apparatus as shown in FIG. 1 is introduced through conduit 110, flows through the internal cooling zone 102, and is withdrawn from conduit 112. The interior cooling zone may be maintained at a constant temperature or a temperature gradient employed by recycling a cooled carrier gas which is introduced through conduit 114 and withdrawn through conduit 116 for recycle back to the chromatographic column. Centrally positioned within the interior cooling zone 102 is an electrical heating resistance wire so that when power is applied from a power supply 106 the electrical energy is converted into heat along the longitudinal flow path of the gas effluent stream through interior cooling chamber 102. Although other internally heated elements may be employed an electrical resistance wire represents one preferred embodiment due to its rapid and ready flexibility and control of the heat to be supplied to the gas effluent stream flowing through the interior chamber 102. As the gas effluent stream is passed through the one to the other end of chamber 102 the heat resistance wire 104 prevents the bulk of the carrier gas in the gas effluent stream from being cooled too rapidly to the saturated or super-saturated condition. The resistance wire provides heat to the center flow portion of the bulk carrier gas, and yet permits the gas effluent stream to be cooled from the surrounding wall as it passes from one to the other end of the cooling zone. As in FIG. 1 substantial condensation of the gas fraction occurs on the interior wall of the cooling zone or tube 102.

The optimum temperature to be employed for the heated wire will differ depending upon the partial pressure of the gas fraction to be collected and the mol percentage of the gas fraction in the carrier gas effluent stream. The power input to the wire should, therefore, be controlled but sufficiently high to obtain the desired heat effect and to avoid supersaturation conditions in the gas effluent stream. A higher temperature than required should normally be avoided to prevent wasting of electrical energy. In a further embodiment of the apparatus of FIG. 2 a temperature gradient may be maintained within the cooling tube 102 by varying the electrical resistivity of the heating wire 104 along its elongated path length. For example, the heating wire may be formed of a plurality of the same or different materials having a different electrical resistivity or the same resistivity but a varying cross-sectional area, or a series of electrical heating wires of the same type aligned in series with separate electrical power requirement furnished to each section. Although electrical means for furnishing control heat to the gas effluent stream allows flexibility, other means such as the use of tubes containing a flowing fluid like hot water or gases can be employed in certain cases. By these means a temperature gradient may be maintained from the one to the other end of the cooling zone. Such a temperature variation may vary from a high temperature of above or below the temperature at which the gas effluent stream is introduced into the cooling tube 102 to a lower temperature at the other end thereof similar to the temperature gradients maintained in the apparatus of FIG. 1.

The apparatus of FIG. 2 has been described as being placed in series with each of the respective cooling zones 26, 30 and 34 of FIG. 1. However, it is also within the contemplation of our invention that an interior heating element such as an electrical heating wire be placed within one or more of the cooling zones in the apparatus of FIG. 1 in a similar manner where close, flexible control of the temperatures through the cooling zone is desired.

Our discovery enhances the efficiency of fraction collecting and inhibits the formation of aerosol particles through the use of a temperature gradient along the gas flow cooling path. Our invention has been described in connection with certain specific and preferred embodiments; however, modifications and changes are within the practice of persons skilled in the art.

What we claim is:

1. In a chromatographic apparatus the combination which comprises:

- a chromatographic column containing separatory material;
- means for introducing a sample material into the chromatographic column;
- means for introducing a carrier gas into the chromatographic column;
- means for withdrawing a gas effluent stream from the chromatographic column, which stream comprises a carrier gas and at least one chromatographic sample gas fraction to be collected; and
- means for collecting a gas fraction from the gas effluent stream so withdrawn from the column, which collecting means includes:

first and second zones in serial relationship with each other, each zone having a one and other end;

means to pass the gas effluent stream withdrawn from the column from the one to the other end of the first zone and into the second zone;

means to pass a cool fluid stream into the other end of the first zone, and in a substantially counter-current direction to the gas effluent stream in the first zone thereby providing a gradual temperature gradient of a relatively high to a relatively low temperature from the one to the other end of the first zone and condensing at least a portion of the gas fraction in the first zone;

means associated with the first and second zones to separate at least a portion of the gas fraction so condensed in the first zone from the cooled uncondensed carrier gas thereby providing an efficient system for the collection of chromatographic gas fractions and said means to pass a cool fluid stream into the other end of the first zone, comprising means to recycle cooled carrier gas from the second zone to the other end of the first zone.

2. The apparatus of claim 1 which includes means to withdraw the carrier gas from the one end of the first zone and to recycle the carrier gas to a chromatograhphic column.

3. The apparatus of claim 1 which includes a plurality of zones enclosed within a common first zone, and means to pass the cooled fluid stream into the common first zone.

4. The apparatus of claim 1 which includes a heating element within the first zone and means to heat the element.

5. The apparatus of claim 4 wherein the heating element is a resistance wire centrally positioned in the first zone.

6. A process for the collection of one or more gas fractions from the gas chromatographic system which process comprises:

introducing a sample material into a chromatographic column containing separatory material;

introducing a carrier gas into the chromatographic column;

withdrawing from the chromatographic column a gas effluent stream comprising a carrier gas and one or more fractions to be collected;

passing a cool fluid stream in a substantially counter-current direction and in a heat exchange relationship to the gas effluent stream so withdrawn to cool gradually the gas effluent stream substantially along it gas flow path from a relatively high to a relatively low temperature, the low temperature being sufficient to condense at least a portion of at least one gas fraction;

separating the condensed gas fraction from the uncondensed carrier gas; and cooling the carrier gas and recycling at least a portion of the cooled carrier gas to provide at least a portion of said cool fluid stream.

7. The process of claim 6 wherein a plurality of different gas effluent streams are cooled in separate zones, and cooled carrier gas separated from each condensed fraction is passed in a common heat exchange relationship with the separate cooling zones of the gas effluent streams.

8. The process of claim 7 wherein the carrier gas is recycled for use in a chromatographic column.

9. The process of claim 6 which includes passing the gas effluent stream over a heated surface in and along the gas flow path.

10. The process of claim 6 wherein the difference between the relatively high and low temperatures ranges from about 150° C. to minus 50° C.

11. In a chromatographic apparatus the combination which comprises:

a chromatographic column containing separatory material;

means for introducing a sample material into the chromatographic column;

means for introducing a carrier gas into the chromatographic column;

means for withdrawing a gas effluent stream from the chromatographic column, which stream comprises a carrier gas and one or more chromatographic sample gas fractions to be collected; and means for collecting one or more of the gas fractions from the gas effluent stream so withdrawn from the column, which collecting means includes:

(a) a heat exchange zone which includes a first and second zone in a heat exchange relationship with each other, means to introduce the gas effluent stream withdrawn from the column into the one end of the first zone, means to recover a condensed gas fraction and means to withdraw a gas effluent from the other end thereof;

(b) a separate recovery zone which includes means to cool the gas effluent stream withdrawn from the first zone and to condense at least a portion of one or more gas fractions therein and to recover a condensed cool carrier gas, means to recover condensed gas fraction, and means to withdraw uncondensed cool carrier gas from the recovery zone;

(c) means to introduce a cool fluid stream into the other end of the second zone and to pass the stream in a substantially counter-current direction to the gas effluent stream in the first zone to provide a temperature gradient of a relatively high temperature at the one end of the first zone and a relatively low temperature at the other end of the first zone, the relatively low temperature being sufficient to condense at least a portion of a gas fraction in the first zone, thereby enhancing the efficiency of collection of the gas fraction from the gas effluent stream and (d) means to recycle the cooled uncondensed carrier gas withdrawn from the recovery zone into the other end of the first zone and to pass the cool carrier gas as the cool fluid stream in a substantially counter-current direction to the gas effluent stream in the first zone.

12. The apparatus of claim 11 which includes means to withdraw the carrier gas from the one end of the second zone and to recycle the carrier gas to a chromatographic column.

13. The apparatus of claim 11 wherein a closed chamber encloses a plurality of first zones within a common second zone and the recovery zone includes a plurality of separate means to recover the condensed gas fractions and includes means to withdraw uncondensed cool carrier gas from each of the separate recovery means, and to introduce cool carrier gas into the common second zone of the closed chamber thereby maintaining a temperature gradient in the closed chamber regardless of the particular gas fraction being collected in the recovery zone.

14. The apparatus of claim 11 which includes a centrally positioned resistance wire within the first zone and means to supply electrical power to heat the wire.

15. In a chromatographic apparatus the combination which comprises:

a chromatographic column containing separatory material;

means for introducing a sample material into the chromatographic column;

means for withdrawing a gas effluent stream from the chromatographic column which stream comprises a carrier gas and one or more chromatographic sample gas fractions to be collected; and means for collecting one or more of the gas fractions from the gas effluent stream so withdrawn from the column, which collecting means includes:

(a) a heat exchange zone which includes a plurality of first zones enclosed within a common second zone, the first and second zones being in a heat exchange relationship with each other, means to introduce into the one end of each of the first zones a gas effluent stream withdrawn from the column and containing a particular gas fraction to be collected, and means to withdraw a gas effluent stream from the other end of each first zone;

(b) a recovery zone which includes means to cool the gas effluent streams withdrawn from the first zones to a lower temperature than that in the first zone, a plurality of means to recover a condensed gas fraction from each particular first zone and provide an uncondensed cool carrier gas, and means to withdraw from the recovery zone the uncondensed cool carrier gas from each of the recovery means; and (c) means to introduce the cool uncondensed carrier gas withdrawn from the recovery zone into the common second zone and to pass the cool carrier gas in a substantially counter-current direction from the other to the one end of the second zone and to one or more of the gas effluent streams in one or more of the first zones, to provide a temperature gradient of a relatively high temperature at the one end of the first zones and a relatively low temperature at the other end of the first zones, the low temperature being sufficient to condense at least a portion of the gas fraction in one or more of the first zones; and (d) means to withdraw the carrier gas from the one end of the second zone and to recycle the carrier gas to a chromatographic system.

16. A process for the efficient collection of one or more sample gas fractions from a gas chromatographic system which process comprises:

introducing a sample material into a chromatographic column containing separatory material;

introducing a carrier gas into the chromatographic column;

withdrawing from the chromatographic column a gas effluent stream comprising a carrier gas and one or more sample gas fractions to be collected;

passing a cool fluid stream in heat exchange relationship and in a substantially counter-current direction to the gas flow path of the withdrawn gas effluent stream to cool the gas effluent stream substantially along its gas flow path from a relatively high temperature to a relatively low temperature, the relatively low temperature being sufficient to condense at least a portion of one or more of the sample gas fractions in the gas effluent stream;

thereafter, separately cooling the gas effluent stream to a temperature below the relatively low temperature to condense additional quantities of one or more of condensed gas fractions and provide a cool uncondensed carrier gas;

recovering one or more of the condensed sample gas fractions; and recycling the cool uncondensed carrier gas separated from one or more of the condensed gas fractions in a substantially counter-current flow direction with the gas flow path of one or more of the gas effluent streams to cool the gas effluent streams as or in addition to the cool fluid stream.

17. The process of claim 16 which includes cooling a plurality of gas effluent streams each containing one or more fractions to be condensed by recycling the cool uncondensed carrier gas separated from the condensed gas fractions in a substantially counter-current flow direction and in a heat exchange relationship to the gas flow paths of the gas effluent streams.

18. The process of claim 16 wherein the temperature gradient along the gas flow path is from about 50° C. to 200° C.

19. The process of claim 16 wherein the relatively low temperature is from about minus 50 to plus 150° C.

20. The process of claim 16 which includes heating the gas effluent stream as it is gradually cooled by passing the gas effluent stream over a heated resistance wire along its gas flow path.

21. A process for the collection or separation of one or more sample gas fractions from a gas chromatographic system which process comprises:

introducing a sample material into a chromatographic column containing separatory material;

introducing a carrier gas into the chromatographic column;

withdrawing from the chromatographic column a gas effluent stream comprising a relatively large amount of a carrier gas and a relatively small amount of one or more sample gas fractions to be collected;

providing a first stage chamber including a plurality of first zones within a common second zone, the first and second zones being in a heat exchange relationship to each other;

passing a cool uncondensed carrier gas stream in a substantially counter-current flow direction to the gas flow path of one or more of the gas effluent streams in one or more of the first zones to provide a temperature gradient in one or more of the first zones of a relatively high temperature at the one end and a relatively low temperature at the other end, the relatively low temperature being sufficient to condense at least a portion of one or more of the sample gas fractions in one or more of the first zones;

withdrawing a cool gas effluent stream from one or more of the first zones;

cooling the gas effluent streams so withdrawn in a second stage to condense additional quantities of one or more of the sample gas fractions and to provide one or more cool uncondensed carrier gas streams;

recovering the condensed gas fractions; and recycling a cool carrier gas stream from the second stage for use in the second zone of the first stage and recycling the carrier gas stream after use in and from the second zone to the chromatographic column.

References Cited

UNITED STATES PATENTS

| 2,242,299 | 5/1941 | Harrington et al. | 62—11 |
| 3,002,583 | 10/1961 | Findlay | 55—197 X |
| 3,046,750 | 7/1962 | Becker | 62—11 |
| 3,174,326 | 3/1965 | Carle et al. | 73—23.1 |
| 3,245,269 | 4/1966 | Ivie | 73—23.1 X |

FOREIGN PATENTS

| 1,203,026 | 2/1963 | France. |

SAMIH N. ZAHARNA, *Primary Examiner.*

REUBEN FRIEDMAN, *Examiner.*

J. DECESARE, *Assistant Examiner.*